Figure 4:
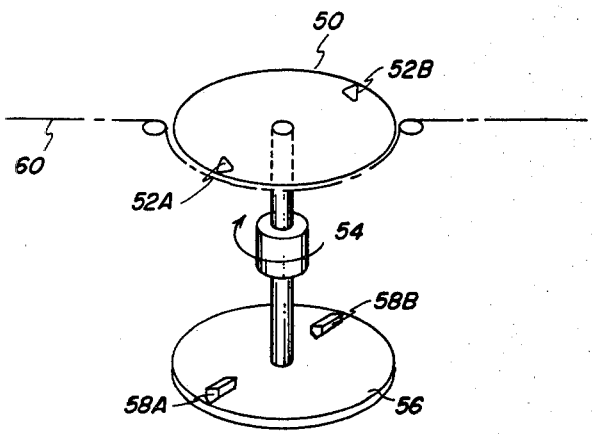

United States Patent [19]

Bixby et al.

[11] 4,290,087

[45] Sep. 15, 1981

[54] COARSE AND FINE CONTROL OF SEGMENTED VIDEO PLAYBACK APPARATUS WITH ANCILLARY RECORDING MEDIUM

[75] Inventors: James A. Bixby, San Diego; Robert A. Lentz, Rancho Sante Fe, both of Calif.

[73] Assignee: Spin Physics, Inc., San Diego, Calif.

[21] Appl. No.: 38,357

[22] Filed: May 11, 1979

Related U.S. Application Data

[63] Continuation of Ser. No. 916,653, Jun. 19, 1978, abandoned.

[51] Int. Cl.³ .............................................. H04N 5/795
[52] U.S. Cl. ....................................... 360/33; 360/10; 360/14; 360/35
[58] Field of Search ...................... 360/9–10, 360/33, 35, 70, 84, 14

[56] References Cited

U.S. PATENT DOCUMENTS

| | | | |
|---|---|---|---|
| 2,874,214 | 2/1959 | Anderson | 360/35 |
| 3,395,248 | 7/1968 | Suzuki et al. | 360/10 |
| 3,454,713 | 7/1969 | Yanagimachi et al. | 360/10 |
| 3,557,320 | 1/1971 | Hopf | 360/10 |
| 3,662,101 | 5/1972 | Segerstrom | 360/10 |
| 3,721,757 | 3/1973 | Ettlinger | 360/14 |
| 3,999,218 | 12/1976 | Iyama et al. | 360/10 |

FOREIGN PATENT DOCUMENTS

| | | | |
|---|---|---|---|
| 1487004 | 9/1977 | Fed. Rep. of Germany | 360/10 |
| 2812877 | 11/1978 | Fed. Rep. of Germany | 360/10 |
| 45-26802 | 9/1970 | Japan | 360/10 |
| 52-15218 | 2/1977 | Japan | 360/10 |
| 2009998 | 6/1979 | United Kingdom | 360/10 |

*Primary Examiner*—Raymond F. Cardillo, Jr.
*Attorney, Agent, or Firm*—Robert F. Cody

[57] ABSTRACT

A system for playback of segmented video information on a tape employs an ancillary recording medium which is rotationally driven at the rotational rate of a primary segment scanning apparatus. Each segment of a video field is recorded in a respective track of the ancillary medium, the information of one field being recorded over the information of another field. By recording only signals of a predetermined quality on the ancillary recording medium, playback of video information from the ancillary medium will produce a coherent display on a display monitor, regardless of the rate at which the tape is run. This is possible because of the one-to-one correspondence between the rotary rates of the scanner and the ancillary medium. Each coherent display is comprised of information from one or a number of video fields. To determine whether signals to be recorded are of the predetermined quality a coarse and a fine measure of signal quality are provided and logically combined. The coarse measure is provided by use of respective identifier tones for the field segments which are played, the purity of the played tones being somewhat determinative of playback signal quality. The fine measure of signal quality is determined by comparing the playback sync rate with a reference sync rate, the error therebetween corresponding to signal quality.

3 Claims, 24 Drawing Figures

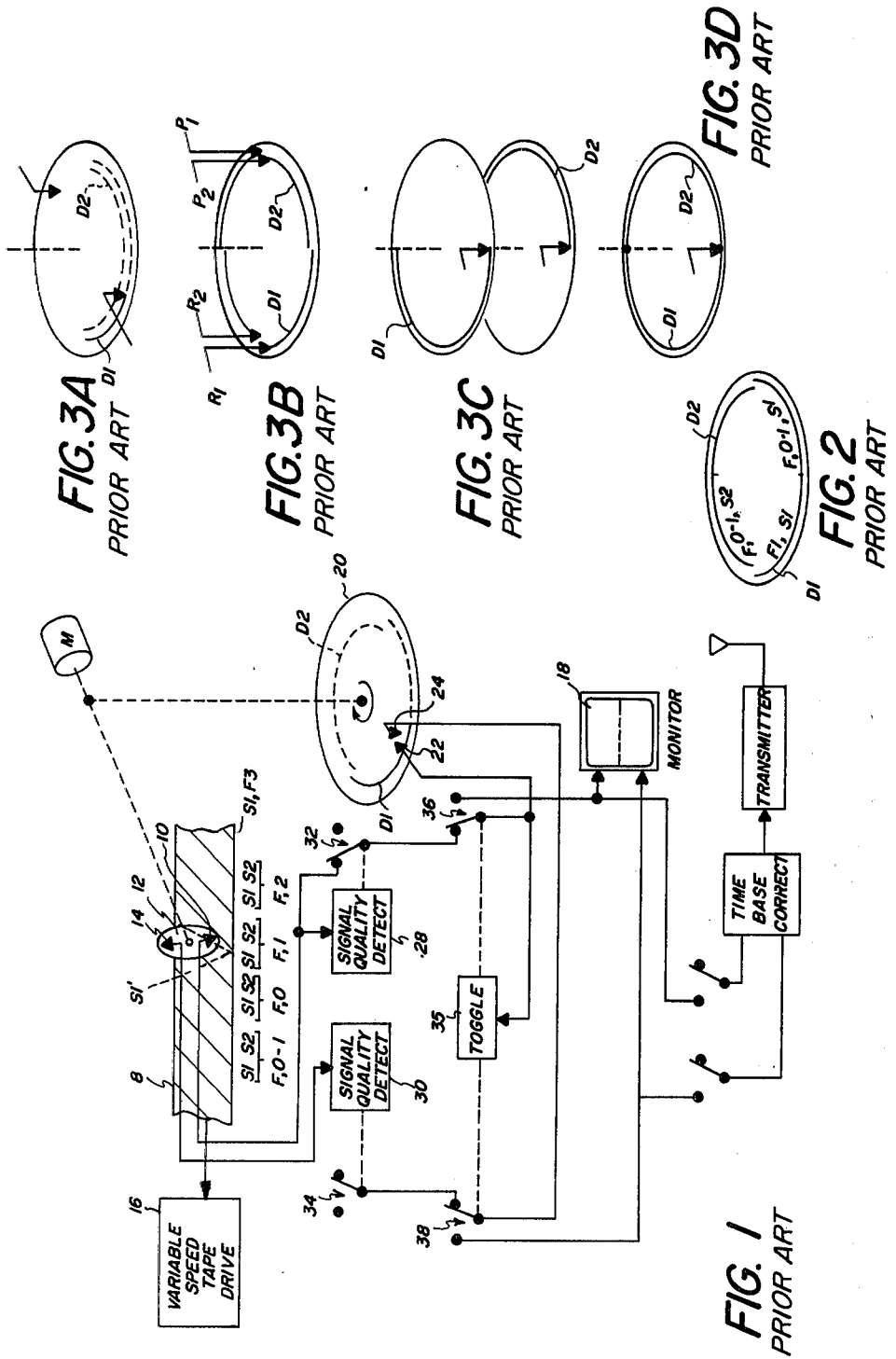

U.S. Patent Sep. 15, 1981 Sheet 3 of 13 4,290,087
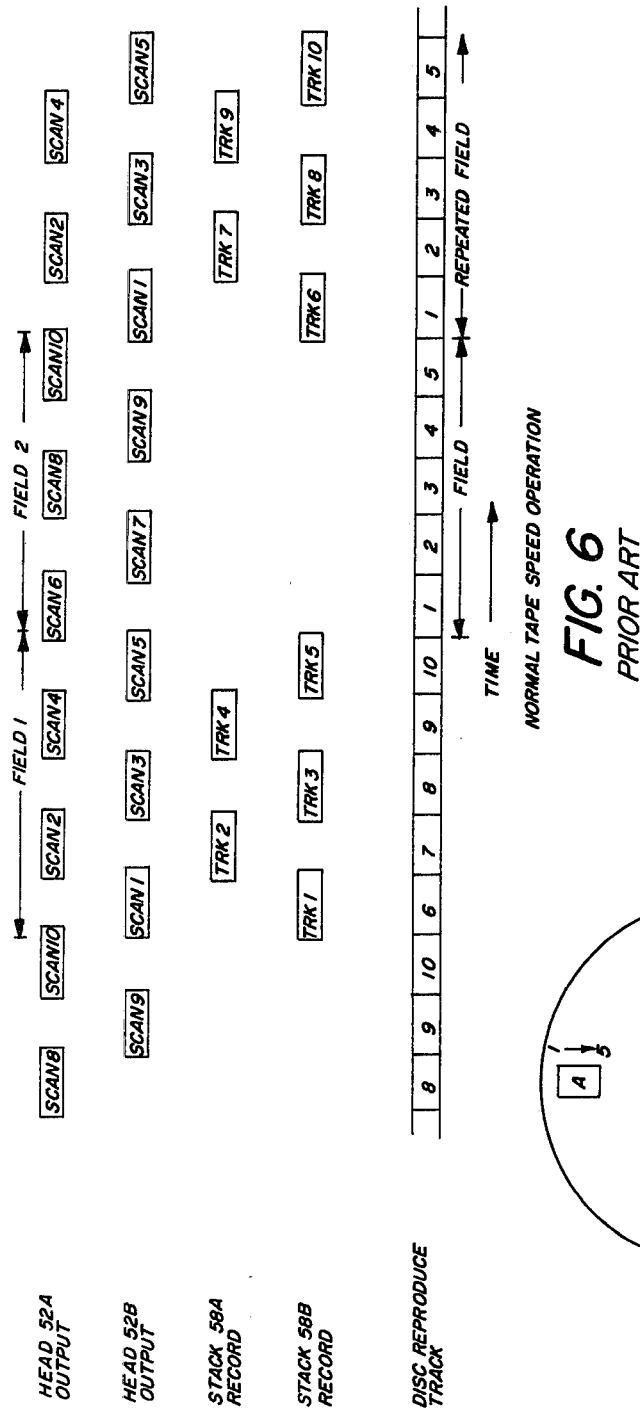
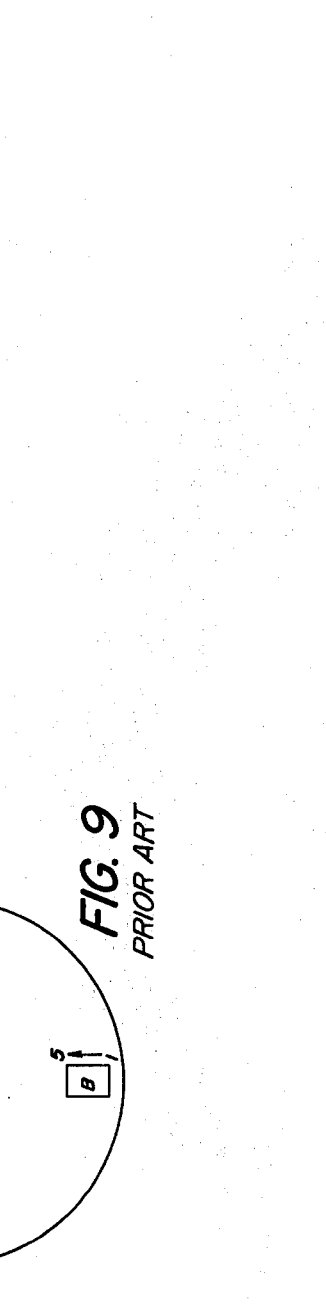
FIG. 6
PRIOR ART
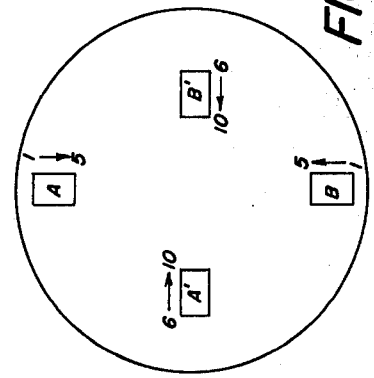
FIG. 9
PRIOR ART

COARSE AND FINE CONTROL OF SEGMENTED VIDEO PLAYBACK APPARATUS WITH ANCILLARY RECORDING MEDIUM

CROSS-REFERENCE TO RELATED APPLICATIONS

Cross-reference is made to U.S. Patent Application Ser. No. 780,945 of Bixby, Lemke & Lentz, filed Mar. 24, 1977, now U.S. Pat. No. 4,193,098.

Reference is also made to abandoned U.S. Patent Application Ser. No. 916,653 filed June 19, 1978, of which the present application is a continuation application.

BACKGROUND OF THE INVENTION

1. Field of the Invention

This invention relates in general to video recording apparatus, and in particular to apparatus for use in replaying segmented video at various speeds, e.g., fast or slow forward, or fast or slow reverse, or stopped, or at normal record speed, as may be required for the editing of video program material recorded on magnetic tape.

2. Description Relative to the Prior Art

The editing of video program material recorded on magnetic tape is a difficult job. Although there are some video recorders which record discrete fields or frames of video information across the width of a magnetic tape, most video recorders record segmented fields. Quadruplex recorders and many helical recorders fall into this category: A quadruplex recorder lays down 16 widthwise tracks, each track of which corresponds to 16.2 video lines, to record a single video field; a helical recorder such as the BCN recorder, produced by Robert Bosch, GMBH, Fernseh Division, Darmstadt, West Germany, lays down five slantwise tracks, each track of which corresponds to about 50 video lines, to record a video field. Because of the segmenting of the video field information, the recorder tape drive—say for purposes of program editing, etc.—cannot be run at any, or no, speed without employing elaborate, and expensive, buffering equipment, viz. an editing machine. One cannot merely plug, say, the playback signal of a variable tape speed quadruplex recorder into a monitor and get a meaningful display on the monitor, unless the quad tape is replayed at its record speed. Where recorded on quad tape to be stopped, the play heads would repeatedly scan the same 16.2 recorded video lines with attendant tearing apart of the image display; were quad tape to be run, say at high speed, the quadruplex heads would "hopscotch" from segment to segment of different fields, again with attendant tearing apart of the image display.

A current practice in the editing of magnetic tapes is to transfer to and store taped program material, along with frame time/program identifiers, in a random access memory, say as in the CMX Editing System of CBS/Memorex. Such an editing system employs 20 disc recording surfaces, each capable of storing five minutes of skip-field (or 2½ minutes of full frame) "2 mHz" video information; and monitor apparatus capable of displaying frame and time information. Selectively, editing decisions for splicing tapes, for lap-and-dissolving scenes, etc. are made by viewing the monitor.

Copending U.S. Patent Application Ser. No. 780,945, now U.S. Pat. No. 4,193,098, to Bixby et al discloses a simplified form of machine useful in the editing of recorded segmented video, such machine being so designed as to obviate the need for a relatively large memory. Basically, the editing machine disclosed in U.S. Pat. No. 4,193,098 employs an ancillary recording surface (disc) that is slaved to the rotational rate of the "playback" scanner that cooperates with a primary record medium (tape). The ancillary recording surface has a number of record tracks corresponding to the number of segments which make up any given video field recorded on the primary medium. As the playback scanner swipes along a field segment on the primary record medium, the signal so produced is recorded on the ancillary medium in a respective designated track. As the next field segment on the primary medium is scanned, it too is recorded in a respective designated track. When segments of other fields recorded on the primary medium are scanned, the "segment" signals so produced are recorded directly over corresponding segment signals on the ancillary medium. By assuring that only signals of adequate quality are recorded on the ancillary medium into a monitor display device, the display which is produced will always be coherent, irrespective of whether the playback segments are from the same or different video fields recorded on the primary medium. Because the monitor display is always coherent, it can be used while running the primary medium at other than its record speed (e.g., fast, slow, stopped, reversed) to identify—for purposes of editing—recorded scenes on the primary medium.

In determining whether a played-back segment signal from the primary medium is of sufficient quality to be recorded on the ancillary medium, the apparatus of U.S. Pat. No. 4,193,098 employs "tone codes". That is, each segment of a field has a corresponding tone code signal associated with it. During slewing of the primary medium, say at a speed other than its record speed, the playback scanner will continually cross from one track to another; a "good video" signal will be produced by the playback scanner when the scanner is "on" a segment track . . . which is to say that one tone signal will be detected; between segment tracks on the primary medium, the playback scanner will detect two (or no) tone signals . . . which translates to a "not good video" situation.

Such a technique for determining the quality of a playback video signal has proved to be okay to a point; however, since playback of tone signals is, at least to some extent, dependent on the quality of the primary recording medium, the discrimination between tone signals is, at best, only a coarse indication of signal quality.

SUMMARY OF THE INVENTION

To provide a reliable test of signal quality in an editing machine of the general type disclosed in U.S. Pat. No. 4,193,098, the present invention provides for the comparison between the phase of playback sync and a reference sync, the error signal so produced being a "fine" indication of signal quality and, as such, a complement to a coarse indication of signal quality. How and why a sync error can serve as an indication of signal quality will be discussed below.

Figure 5:
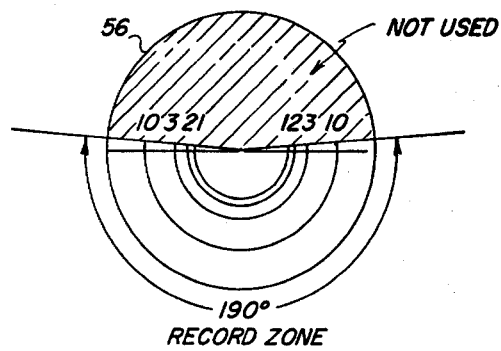
Figure 7:
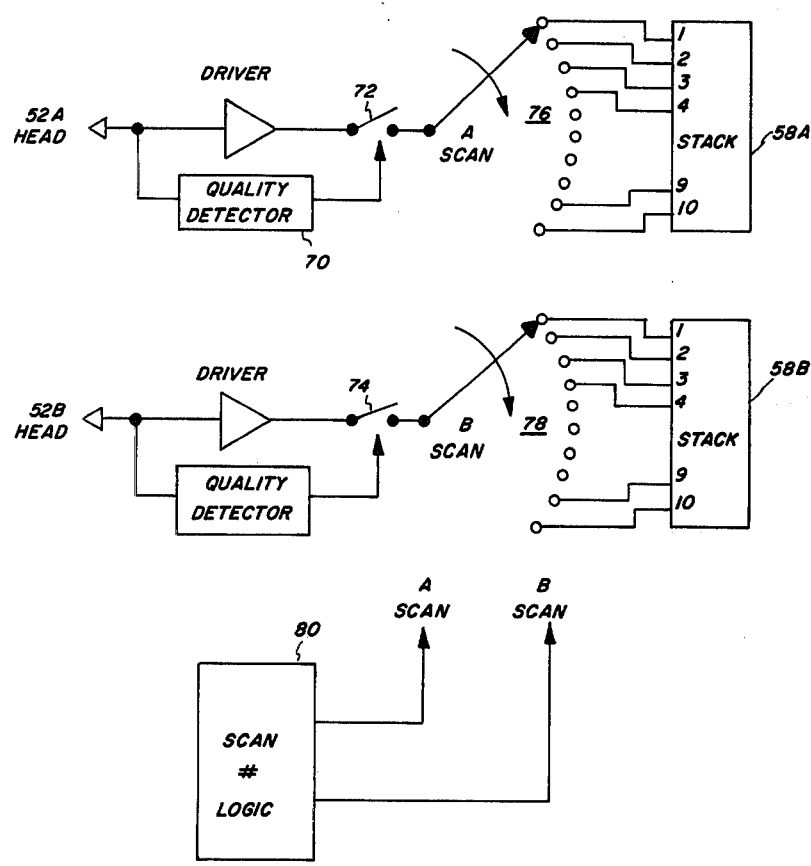
Figure 8:
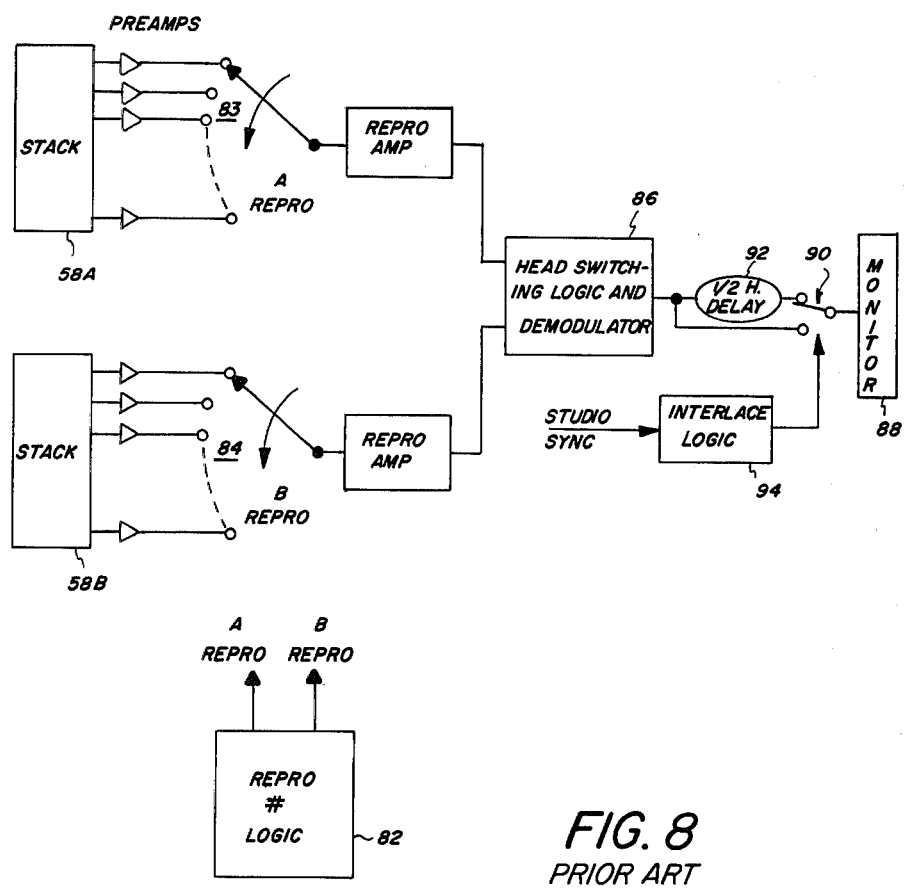
Figure 10:
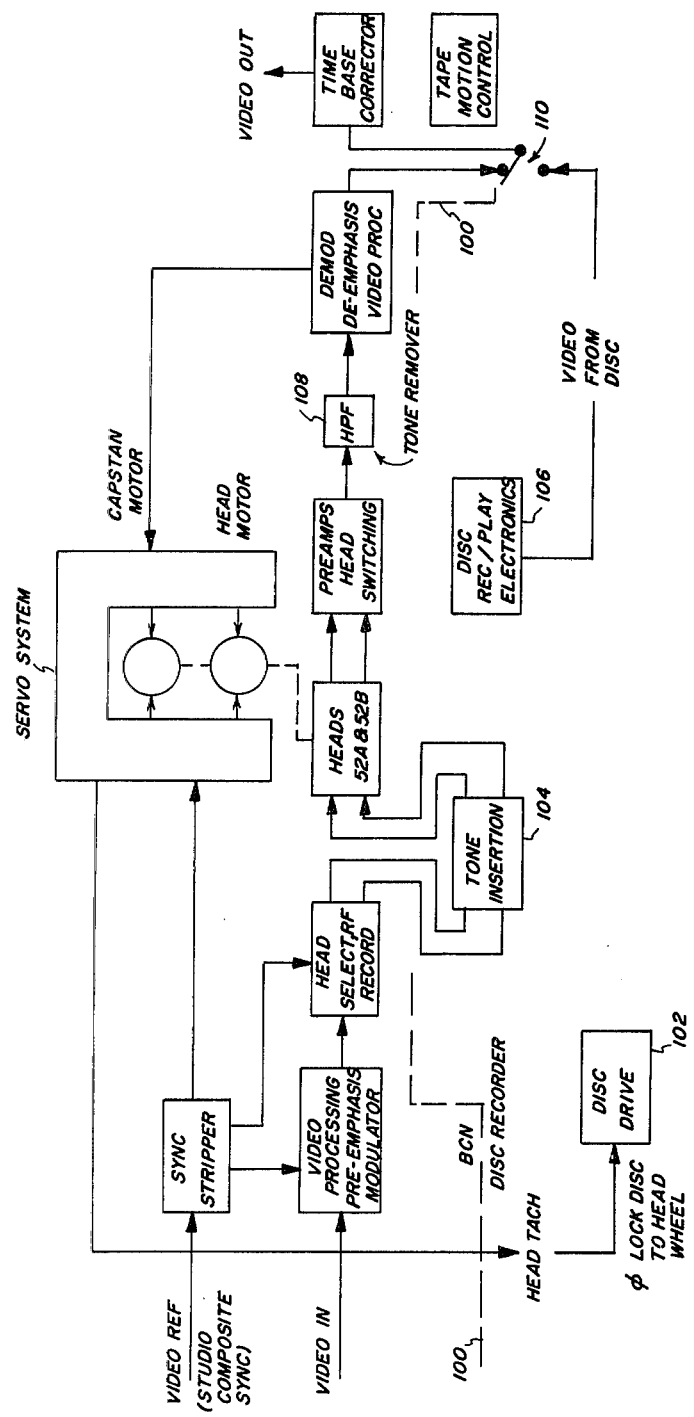
Figure 11:
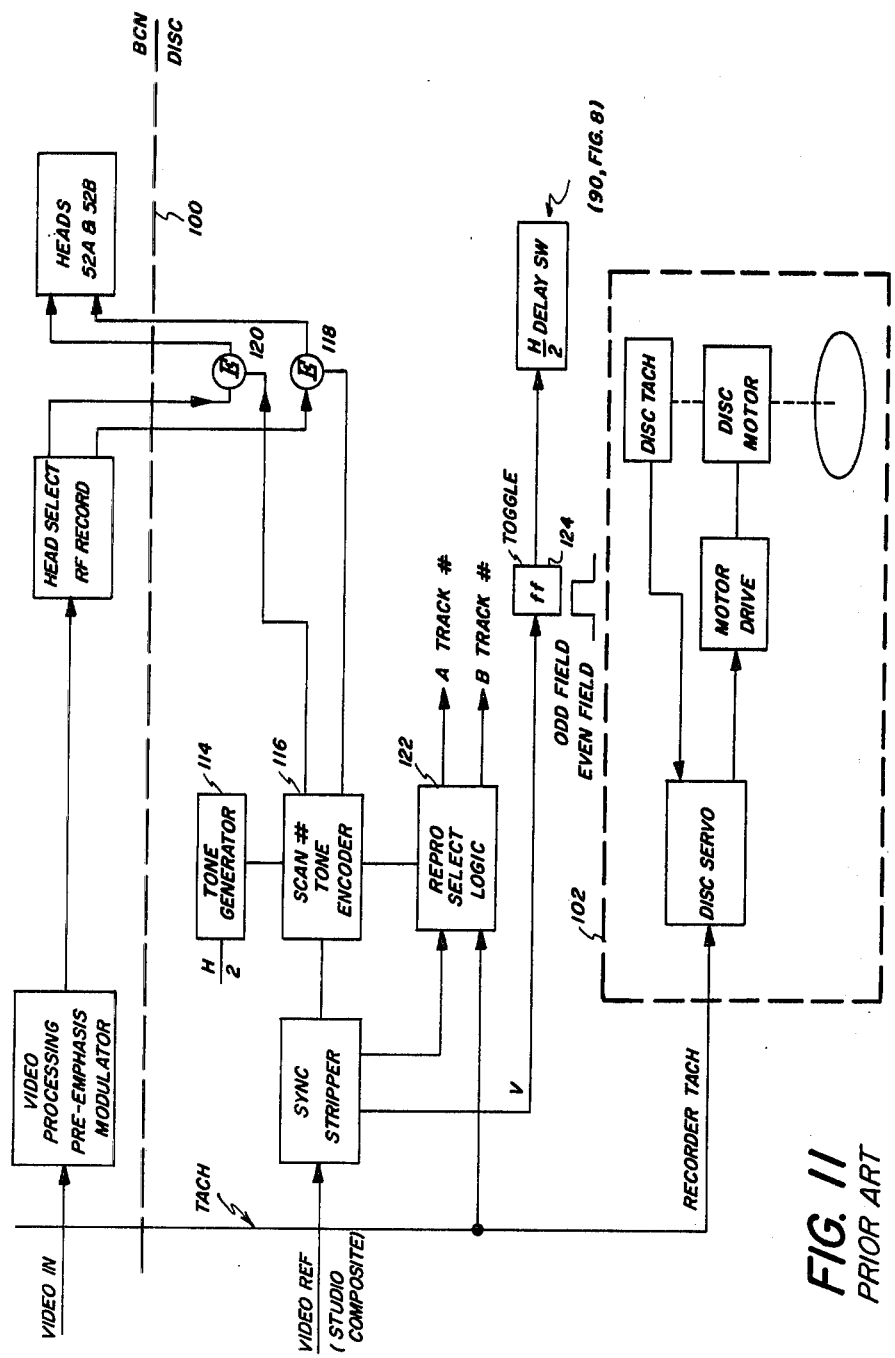
Figure 12:
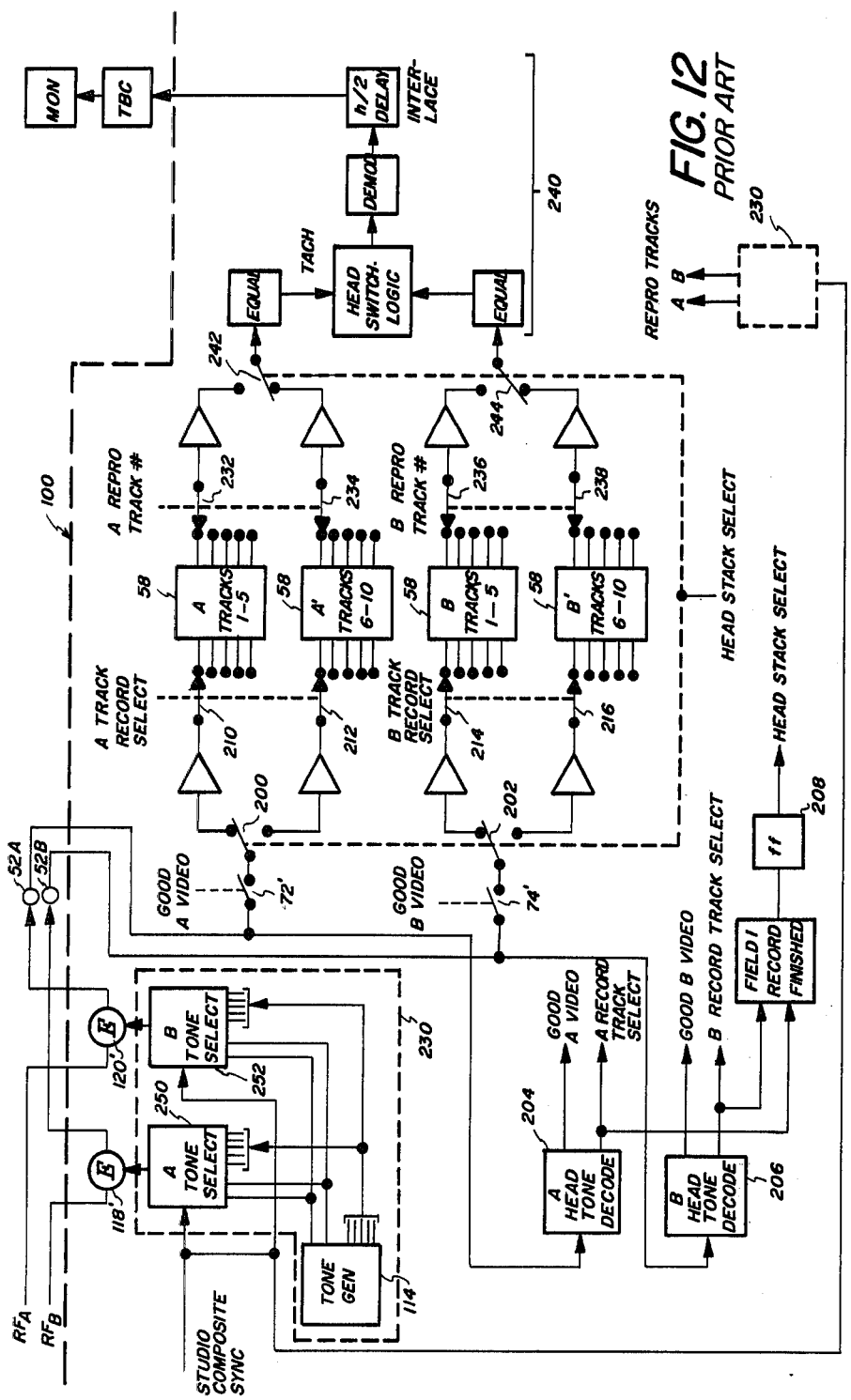
Figure 13:
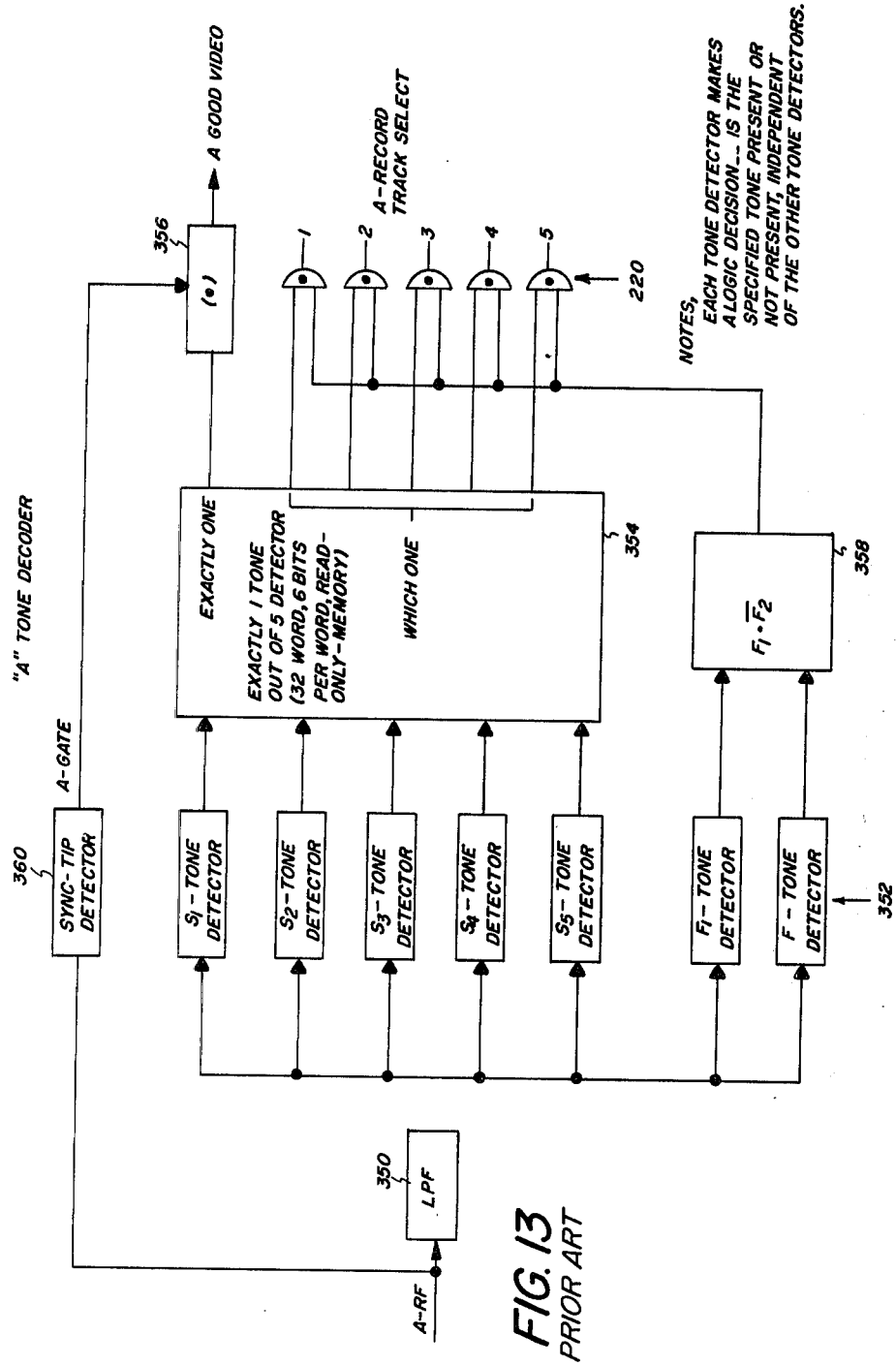
Figure 14:
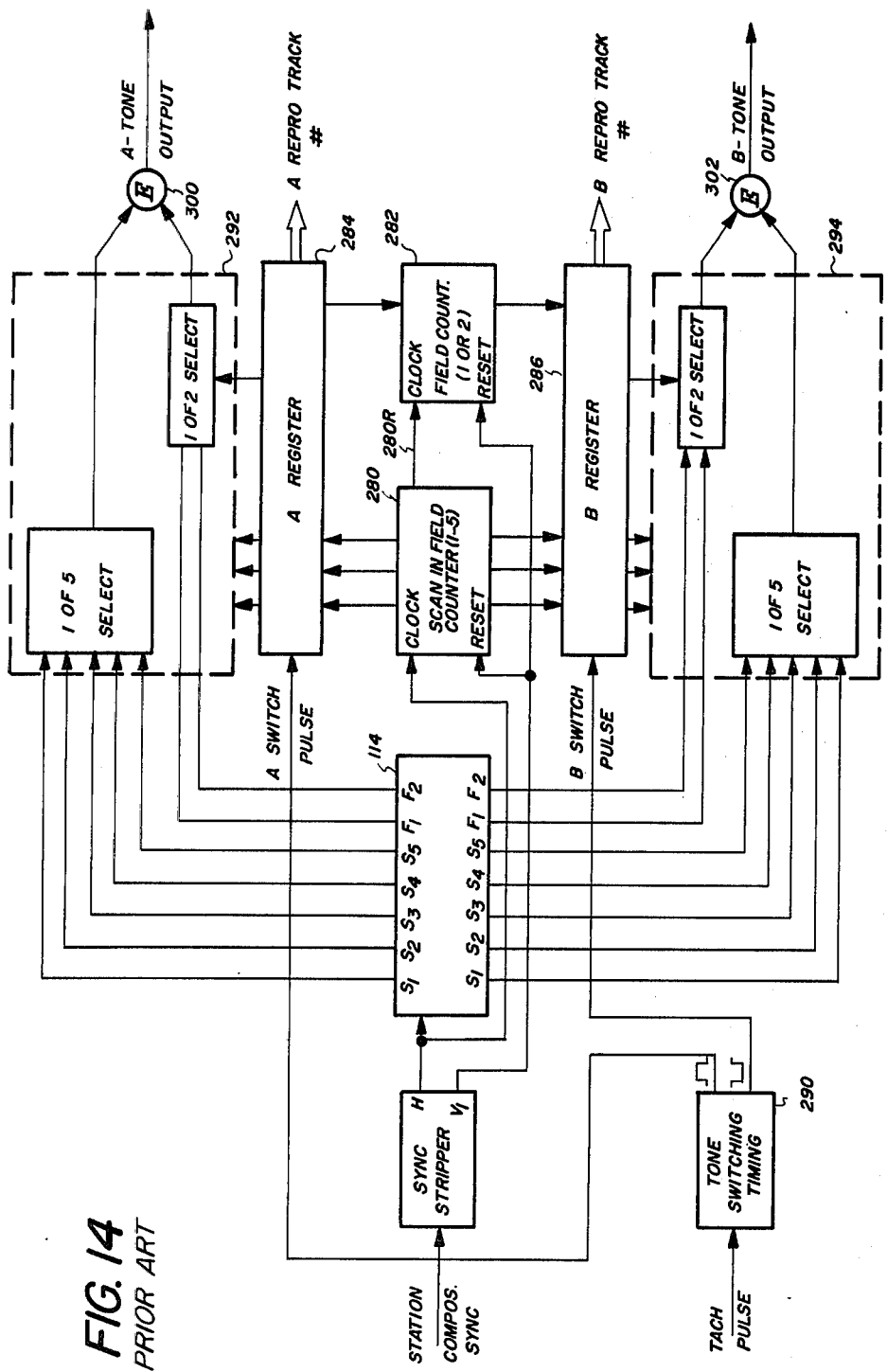
Figure 15:
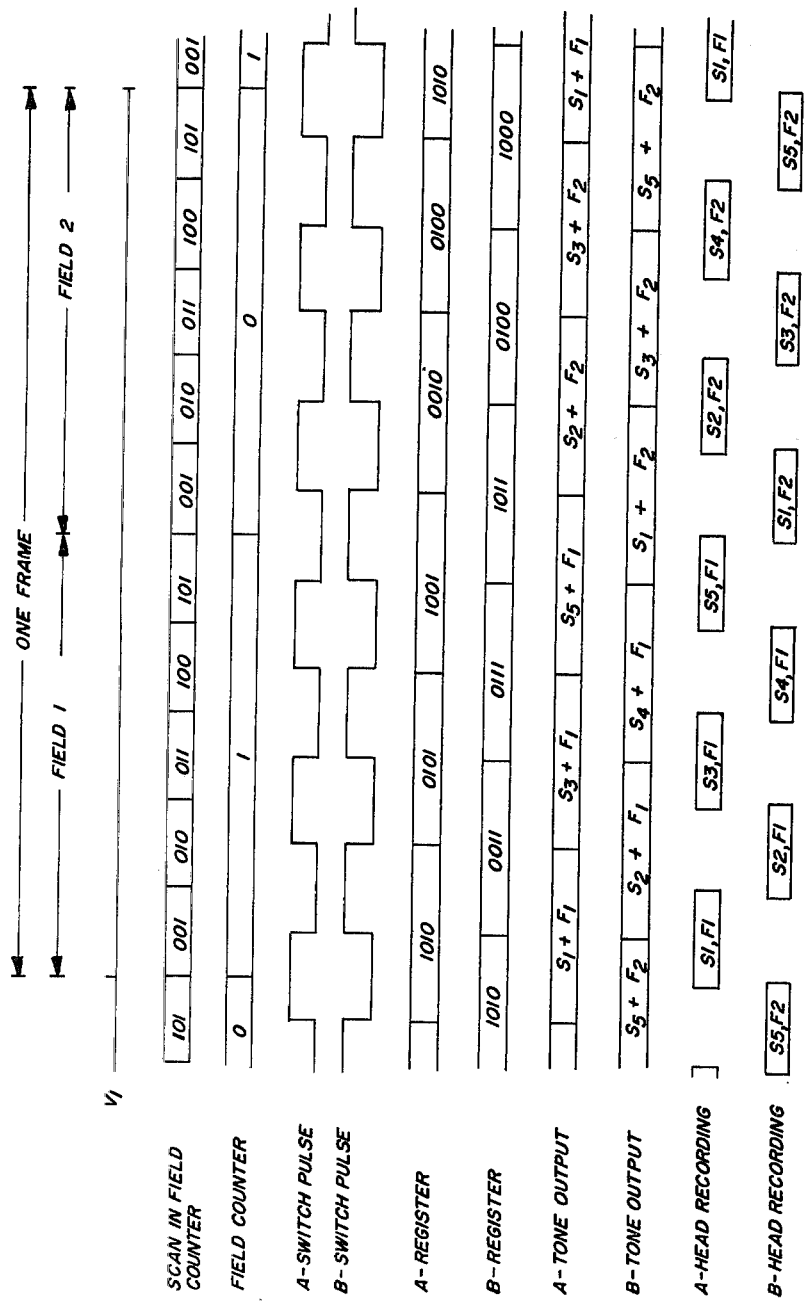
Figure 17A:
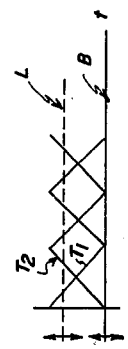
Figure 17B:
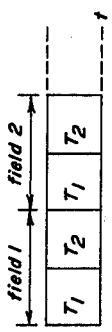
Figure 18B:
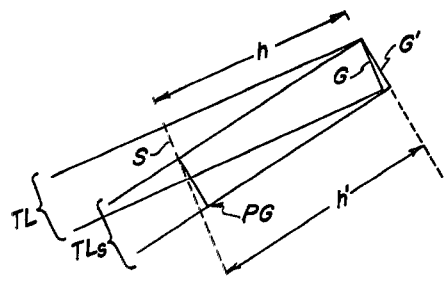
Figure 18A:
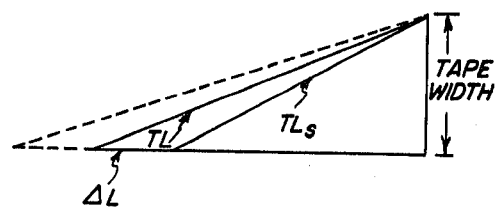
Figure 19:
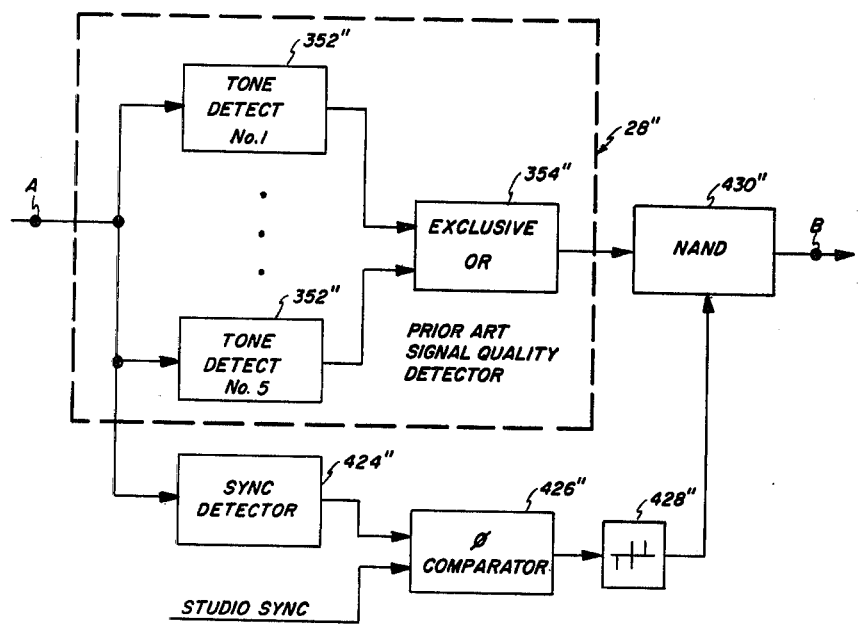

The invention will be discussed with reference to the Figures, of which:

FIG. 1 is a block diagram illustrating the general concepts of the invention of U.S. Pat. No. 4,193,098, FIG. 2 illustrates a disc recording made while practicing the invention of U.S. Pat. No. 4,193,098, FIGS. 3A-3D illustrate various modifications according to the practice of the invention of U.S. Pat. No. 4,193,098, FIG. 4 is a perspective view illustrating one form of scanning wheel-to-disc slaving according to the invention of U.S. Pat. No. 4,193,098, FIG. 5 is a schematic showing of a disc made in accordance with the apparatus of FIG. 4, FIG. 6 is a timing diagram useful for an understanding of apparatus according to the invention of U.S. Pat. No. 4,193,098, FIG. 7 is a schematic block diagram illustrating the disc record function as practiced by the invention of U.S. Pat. No. 4,193,098, FIG. 8 is a schematic block diagram illustrating the disc play function as practiced according to the invention of U.S. Pat. No. 4,193,098, FIG. 9 is a schematic showing of a presently preferred arrangement of multitrack heads for practicing the invention of U.S. Pat. No. 4,193,098, FIG. 10 is a general block diagram illustrating the interconnection between a commercially available video recorder and apparatus according to the invention of U.S. Pat. No. 4,193,098, FIG. 11 is a block diagram illustrating in greater detail the apparatus of FIG. 10, FIG. 12 illustrates a presently preferred implementation of the invention of U.S. Pat. No. 4,193,098, FIG. 13 is a schematic block diagram illustrating tone decoding logic for practicing the invention of U.S. Pat. No. 4,193,098, FIG. 14 is a schematic block diagram illustrating tone select logic useful in the practice of the invention of U.S. Pat. No. 4,193,098, FIG. 15 is a timing diagram useful for understanding the operation of apparatus disclosed in FIGS. 9-14, FIG. 16 is a block diagram of apparatus which consolidates those features of the apparatus of U.S. Pat. No. 4,193,098 which are directed to structure improved by means of the invention, FIGS. 17a and 17b are tone-indicative diagrams useful in explaining the invention, FIGS. 18a and 18b are vector diagrams useful in describing the invention, and FIG. 19 is a block diagram of a circuit according to the invention and which may be incorporated by the circuit of FIG. 16.

With reference to the apparatus of U.S. Pat. No. 4,193,098, FIG. 1, consider a simple segmented frame helical recorder in which each recorded frame is comprised of two recorded scan tracks on magnetic tape 8. (In this embodiment, in the interest of explaining the concept(s) of the apparatus of U.S. Pat. No. 4,193,098, no attention is paid to such known techniques as plural fields per frame and the interlacing of fields, as is the practice in commercial television.) As shown, a scan track S1 is traversed by a head 10 of a scanning assembly 12; at the instant the head 10 leaves the scan track S1 a head 14 starts to traverse a scan track S2. The scanning assembly 12, during both record and playback, maintains a uniform head-to-tape speed. In the embodiment of FIG. 1, the scan tracks S1 and S2 comprise a video frame F1, the scan track S1 corresponding to the top half of a scene, and the scan track S2 corresponding to the bottom half of that scene.

Were the tape 8, which is driven by a variable speed tape drive 16, run at precisely the recording speed, signals produced by the heads 10, 14 could be applied directly to a monitor 18 to produce a coherent display. In the editing (and similar) function, however, high, low, and stop tape speeds are dictated: By slaving, e.g., by a direct linkage, an ancillary record medium such as a magnetic disc 20 to the scanning assembly 12, line-to-line correspondence is assured between the tape and disc, regardless of the frame being instantaneously recorded. By providing a particular disc track D1 (head 22) for the top half of a scene, e.g., the scene half corresponding to the scan track S1, and a different disc track D2 (head 24) for the lower half of a scene, e.g., the scene half corresponding to the scan track S2, the heads 22, 24 will, when playing back disc-recorded information, always produce signals which are properly timed in relation to their position within a frame displayed on the monitor 18.

Signals produced by the scanning heads 10, 14 are applied respectively to detectors 28, 30—which may for example be envelope detectors—and—so long as the detected signals are of sufficient quality, say, in terms of SNR—such signals are applied to heads 22, 24. In the event the signals read from the tape are weak, the detectors 28, 30 actuate respective switches 32, 34 to prevent low grade signals from being recorded on the disc 20.

Consider now that the tape 8 is played back while running at its record speed: The head 10 picks up the signal recorded on the segment scan S1 and applies it to the head 22 for recording on the disc track D1. Since the tape is running at its record speed, the head 10 runs right along the segment scan S1 and produces a good quality signal. Similarly, the head 14 runs along and produces a good quality signal from the segment scan S2 for recording on the disc track D2. As the head 10 starts along the segment scan S1 of the next frame F2, switches, 36, 38 are toggled (35), thereby preventing the F2 segment scan signals from being applied to the disc 20 while, simultaneously, causing the disc heads 22, 24 to play back "skip frame" segmented video information. In providing skip frame playback, the D1 disc track information is first read by the head 22 and applied to the monitor 18 to paint in the top half of the frame F1 on the monitor; then the disc track D2 information is read by the head 24 and applied to the monitor 18 to paint in the lower half of the F1 frame. As soon as the scanning head 10 starts to track along the segment scan S1 of the frame F3, the switches 36, 38 are again toggled, removing playback signals from the monitor 18, and causing the frame F3 segment scans to be recorded over the F1 segment scans.

Now consider the case of a stopped tape, such as a case in which the scan head 10 starts along, and at the beginning of, segment scan S1: Under such a situation, the head would travel vis-a-vis the tape 8 along the path S1' (see FIG. 1) and attendantly a good scan signal would only be produced by the head 10 for part of the F1, S1 scan. As soon as the signal dropped below a certain quality level, the detector 28 would actuate the switch 32, thereby causing the disc track D1 to comprise S1, F1 information for part thereof, and S1, F0-1 for the remainder thereof. Similarly, the disc track D2 would comprise S2, F0-1 information. (See FIG. 2.) Playback of the disc information results in a coherent display comprised of parts of two frames, but since those frames correspond to relatively close, timewise, scene information, the monitor 18 display is quite good. Such good playback is made possible by the transferring, segment-by-segment, of tape information to respective tracks of the disc 20 while assuring that the disc segments are formed of only good quality signals, without regard to the originating frame of such signals.

High speed playback of the tape 8 similarly produces a coherent display on the monitor 18 . . . such display, however, being formed of signal information from a number of frames dependent on the rate at which the tape is run, i.e., the disc track D1 may comprise the first 10 lines of frame F40, the 11–20 lines of frame F30, the 21–30 lines of frame F20, etc . . . the point being that the disc 20 in both of its tracks D1 and D2, only records up-dated scene information which is represented by good quality signals.

As noted in FIG. 3 (A to D), the apparatus of U.S. Pat. No. 4,193,098 is not restricted to the use of side-by-side disc heads but, indeed, may employ heads at different radial positions about the disc (FIG. 3a), thereby effecting side-by-side disc tracks; or the disc may be run, say, at ½ speed relative to the head wheel scanning speed, in which case, typically, the track D1 would be laid down (record head R1) followed by the laying down (record head R2) of track D2—playback in this embodiment being effected after a skip frame, by playback heads P1, P2; or, as in FIG. 3c, the embodiment of FIG. 1 can be effected by playing the D1 and D2 tracks on respective discs; or, as in FIG. 3d, a single head may be employed to lay down a single disc track which in effect is comprised of two discrete semicircular disc tracks which run into each other, etc. What is common to the techniques disclosed in connection with FIGS. 1 and 3 is that each discrete track on the ancillary record equates with one segment scan on the tape 8, and since the ancillary record and tape are slaved to each other there is line-to-line correspondence between the ancillary record and the angular rotation of the scanning assembly 12. Such being the case, the assurance that only "quality" information is recorded on the ancillary record means that the ancillary record during playback will produce a coherent display on the monitor 18.

With the above as background, the apparatus of U.S. Pat. No. 4,193,098 will now be described in relation to its use as an editing machine designed for cooperation with a helical recorder such as the BCN recorder mentioned above:

Although the BCN recorder will be indicated in more detail below, it is here noted that the BCN recorder is a helical scan video tape recorder, the head wheel of which has two heads and runs at 9000 RPM, the tape having a 190° wrap about the head wheel. Such being the case, the head wheel during recording lays down five segment scan tracks (52 video lines per segment scan) on the tape for each recorded video field (ten segment scan tracks for each recorded video frame).

Reference should now be had to FIG. 4 in which the BCN head wheel 50—with its diametrically opposed record/play heads 52A, 52B—is shown driven (at 9000 RMP) by a motor 54 which also drives a magnetic disc 56 (also at 9000 RPM). Diametrically opposed multi-track heads 58A, 58B (hereafter sometimes referred to as stacks)—which stacks also function selectively as both record and play heads—cooperate with the disc 56. In this embodiment, each head 58A, 58B is a ten-track head; and the heads 58A, 58B are so aligned that either may record in and read from the tracks of the other. See FIG. 5. Thus, one field of a conventional "two fields per frame" video signal may be accumulated in one set of five disc tracks, scann-by-scan, while a different complete field is displayed from signals produced from the other five tracks of the disc 56. By disabling the record function of the head stacks 58A, 58B periodically, skip field playback of the video information on the tape 60 of the recorder may be effected.

Before addressing the disc record and reproduce switching logic, it is considered appropriate to describe first, in terms of the timing diagram of FIG. 6, the functions of the multitrack heads 58A, 58B in relation to the BCN heads 52A, 52B when the BCN tape drive is running at "record" speed: Consider the first field of a video signal produced by heads 52A, 52B: The first segment scan signal is switched to the first disc track via the head stack 58B; the second segment scan signal is switched to the second disc track via the head stack 58A; the third segment scan signal is switched to the third disc track via the head stack 58B; etc. Importantly, while the head stack 58B records in the first disc track, that head stack reads the video information previously recorded in track 6, etc. During the first segment scan of the second tape recorded field (segment scan 6)—which is one field later than the time when the first field was recorded on the disc—the first field is read by switching between the head stacks 58A, 58B. While playing back the first field, the head stacks 58A, 58B are disconnected from the heads 52A, 52B; therefore, no "second field" signals (from segment scans 6–10) are recorded on the disc 56 at this time. After additional disc rotation, i.e., during the first field of the next video frame, the connections between the heads 52A, 52B and the head stacks 58A, 58B are remade, during which time playback of the field recorded in disc tracks 1–5 is repeated.

Now keeping in mind the one-to-one correspondence of the video lines of the segment scans and the disc tracks, and referring to FIG. 7, disc recording of the segment scans is effected as follows: Assuming the head 52A produces a segment scan signal of adequate quality (as determined by a detector 70) it is applied via a switch 72 to the head stack 58A for recording in one of the ten disc tracks. Similarly, the head 52B cooperates with the head stack 58B to record via a switch 74 quality signals in one of the ten disc tracks. Disc track selection switches 76, 78 cooperate with the head stacks 58A, 58B and index (at least in the case of playback at record speed) as the recording of each track on the disc is completed. Because the BCN recorder heads 52A, 52B—for about 10° of head wheel rotation—simultaneously reproduce play signals, the switches 76, 78 are independently indexed. That is, the switch 78 will, for example, index while the head stack 58A is still recording a track on the disc. Such indexing is effected by keeping track of the segment scans using a scan number logic 80 to be discussed later.

Reference should now be made to FIG. 8. Since the scan number logic 80 of FIG. 7 keeps track of which segment scan is recorded in which disc track, logic 82—also to be discussed later—keeps track of which disc track is to be reproduced at a given time. The logic 80, 82 functions are complementary. As in the case of overlapping segment scans on the tape, the disc tracks correspond to 190° of the disc whereas the head stacks 58A, 58B are 180° apart. Thus, the logic 82 indexes track selecting switches 83, 84 independently . . . the selection of the appropriate 180° of a disc track being effected by a head switching circuit 86 as is the practice in the art. As the switches 83, 84 successively index to produce five disc recorded segment signals corresponding to field one of a frame, those segment signals are applied to a monitor 88. At the completion of that field one, and in response to a vertical sync pulse produced by studio composite sync, a switch 90 is toggled by logic 94 to insert an h/2 delay 92 between the disc and monitor. Therefore, since each disc recorded field is played twice (see FIG. 6) the first field is interlaced with itself on the monitor 88.

PRESENTLY PREFERRED PRACTICE OF THE INVENTION OF U.S. Pat. No. 4,193,098

In the presently preferred form of the invention of U.S. Pat. No. 4,193,098, two techniques which have heretofore not been discussed are employed:

The first techniques is to effect, in the tape recording made "by" the BCN recorder, segment and field identifier information. In particular, the BCN recorder is caused to record two respective tone signals (each outside the RF passband of interest) for each segment scan, one tone identifying which of two fields is being recorded and the other tone identifying which of the five segment scans is being recorded by the BCN recorder. Thus, seven tones are employed to identify the ten segments of each tape recorded video frame. Aside from this, the tones serve to indicate whether good quality signals are being played back by the BCN, i.e., scanning along a segment scan will produce the field tone and one segment tone, whereas scanning between tracks (as may occur during BCN playback at other than the record tape speed) will produce a field tone and two segment tones.

The other general technique worthy of note is that the two ten-track heads as discussed in connection with FIGS. 4–8 have been split into four five-track heads (see FIG. 9), thereby to preclude the same head stack from both playing and recording simultaneously.

Referring to FIG. 10, the BCN recorder, modified to accommodate the apparatus of U.S. Pat. No. 4,193,098, appears to one side of a dashed line 100. To the other side of the line 100, however, apparatus (which will sometimes be called a disc recorder) for implementing the invention of U.S. Pat. No. 4,193,098 is depicted, such apparatus deriving signals from the BCN recorder for processing by the disc recorder:

In this embodiment, rather than the direct coupling between the tape and disc drives for slaving the drives together, the disc drive (102) is phase-locked to the head wheel of the BCN recorder. As noted above, also, the signals which are to be recorded by the BCN heads 52A, 52B are applied to a tone insertion circuit 104, and returned after tone insertion to the BCN recorder for recording on tape.

During operation of the BCN recorder, while practicing the invention of U.S. Pat. No. 4,193,098, the head (52A, 52B) output signals are applied as noted generally above, and more particularly below, to disc record/play electronics 106. (To effect conventional playback from the BCN recorder, a tone removing high pass filter 108 is incorporated in the BCN recorder; and a switch 110 is provided.) For playback to a monitor as part of the editing function, the disc electronics 106 applies interlaced skip field disc signals, via the switch 110, to the BCN time base corrector, and thence to a monitor, not shown in FIG. 10.

Referring now to FIG. 11, the disc servo system 102 is depicted, as well as the tone encoding and insertion apparatus. Seven tones (each of an odd multiple of h/2 rate) are available from a tone generator 114. Since studio composite sync is applied to both the BCN recorder and to the disc recorder, a tone encoder 116 logically decides which tones are to be selectively inserted (summers 118, 120) during the recording of the respective BCN tape tracks. And, since the disc recorder both records and plays in synchronism with the BCN recorder—which like the disc recorder is synchronized to the studio composite sync—logic 122 effects selection of which head stack, and which disc track, is to be played back at a given time.

Vertical sync, derived from the studio composite signal, effectively determines whether the field being played from the disc is to be an odd or even field. That is, the vertical sync pulse V toggles a flip-flop 124 to actuate the switch (90, FIG. 8) for h/2 delay insertion to effect skip field interlacing.

Turning next to FIG. 12, the apparatus of FIGS. 9–11 is shown in still greater detail: For a description of the operation of the apparatus of FIG. 12, however, it is thought best to consider the disc record and reproduce functions first. As good video is produced by the BCN heads 52A, 52B, such video is applied via switches 72', 74' to head stack selecting switches 200, 202 which direct the good video to appropriate tracks of the disc. Selection of which disc track receives the video to be recorded is determined by a record track select function produced by decoding the tape recorded tones (204, 206). The record track select function effects indexing of the switches 210, 212, 214, 216; and, as is the case with such switches and other components hereof, these may take a variety of forms. After each set of five successive tones is detected, a flip-flop 208 is actuated. This causes any good video which is being received to switch to a different set of five disc tracks (during which time the video just recorded is reproduced). To be noted is that "good video" as identified in FIG. 12 is video which is both of a certain quality "and" which is derived from the first field of a tape recorded frame. (See the logic functions provided by the gates 220 of FIG. 13). Therefore, during each second field of each frame, the switches 72', 74' are open.

Because of the overlap of the segment scans on the disc, the selection of reproduce tracks, as noted above, must be independent of the record track selection. To this end, reproduce track selection is provided by logic 230 forming—as will be discussed later—part of the tone insertion apparatus used for segment scan encoding. (In the interest of clarity, the circuit 230 is shown at two places in FIG. 12.) Since studio sync effects assignment of tones to the BCN segment scans, and since the disc and head wheel are slaved to each other, such "assignment" is employed to effect selection, via switches 232, 234, 246, 248 of the reproduce tracks. (This is to be distinguished from the recorded track select function which requires tone decoding to determine track selection . . . a requirement resulting from the possibility that a recorded field may comprise a video line information from several segment scans.) Toggling of the outputs of the heads 58AA', 58BB' to the disc play electronics 240 is provided by switches 242, 244, which are actuated by the head stack select logic (flip-flop 208). Note should be taken that the switches 200, 202 operate 180° out of phase with the switches 242, 244, thereby to provide recording in one of a set of five tracks while reproducing from one of a different set of five tracks as noted in connection with the timing diagram of FIG. 6.

Turning now to the BCN recording function, and in particular to the encoding of the BCN tape segment scans by means of tones, the tone generator 114 applies its two field and five segment tones to logic 250, 252 for assigning tones to the respective tape segment scans . . . such logic being, as noted above, controlled by studio sync. As a pair of tones together alternately exit from the logic circuits 250, 252, they are combined (summers 118', 120') with the RF video being applied to the BCN heads 52A, 52B. FIG. 14, in combination with the timing diagram of FIG. 15, provides greater detail as to the workings of the circuit 230: The composite sync H pulses are applied to the tone generator 114 to effect seven discrete tones all of which are of an odd multiple of the h/2 frequency. Each tone corresponds to either one of two field identifiers or one of five segment scan identifiers, as noted above. A clock/counter 280 receives the studio H sync pulses and keeps track of which segment within a field is being recorded by the BCN recorder; and a clock/counter 282 keeps track of which field of a frame is being recorded by the BCN recorder. The instantaneous counts of the counters 280, 282, are applied to registers 284, 286, the count of the counter 280 being changed at the start of each tape segment scan and the count of the counter 282 being changed after every five segment scans (line 280R). At the start of, say, the first segment scan of a first video field, the counter 280 is set to "001", and the counter 282 is set to "1". After 52 h pulses (52 being the number of lines per segment scanned) are received by the counter 280, its count becomes "010", the count of the counter 282 remaining at "1". Thus, for "segment scan one, field one", the register 284 will store the count "0011". At the start of "segment scan two, field one", and in response to a timing pulse (290) derived from the BCN head wheel, the register 286 is loaded with the count "0101". Such count-changing continues until the fifth segment scan count (101) has been reset back to the first segment scan count (001), at which time the count of the counter 282 changes. This means that during the second field being recorded by the BCN recorder, the fourth bit of any count in either register 284, 286 is "0". The counts stored by the registers 284, 286 are respectively updated during every 180° of head wheel rotation, the timing being such that each register changes its count while its corresponding BCN head is not in contact with tape. (The vertical sync pulse $V_1$ of the studio composite sync, corresponding to the first field of a video frame, is employed as a reference to set the counters 280,282 and serves to establish system timing.)

The five segment scan tones of the tone generator 114 are applied to logic circuits 292, 294, as are the field tones. The logic circuits 292, 294 select one of five tone signals, as determined by the counts they respectively receive from registers 284, 286. Although different tones will appear at the outputs of the logic circuits 292, 294, only the proper tones will be processed to the BCN tape record electronics, the other tones being applied to the BCN head which is not in contact with the BCN tape. Similarly, the field tones are selected . . . and combined with the segment scan tones (300, 302) for combining with the BCN RF signals 118', 120' being recorded.

Tone detection and decoding as required for determining disc record track selection, and for determining whether good video is being received from the BCN recorder during playback thereof, is discussed in relation to FIG. 13 which shows one (the A tone decoder) of two identical tone decoders 204, 206 (see FIG. 12):

As the BCN head 52A scans a taped segment scan, a representative tone is generated and isolated by a low pass filter 350. The tone output of the low pass filter 350 is applied to seven tone detectors, identified generally as 352; and each tone detector produces a bit signal whenever it receives a tone signal. The segment scan tone detectors 352 apply their bit signals (as five bit words) to a read-only-memory 354 which has been programmed to provide outputs on six output leads: five of the read-only-memory output leads cooperate with gates 220 (discussed above in connection with FIG. 12); and the other read-only-memory output cooperates with an AND circuit 356. The field tone detector bits are applied to logic 358 which toggles to apply "enable" bits to the gates 220. As noted in the program below characterizing the read-only-memory 354, the read-only-memory (and logic 358) in response to tone representative bits, effects (1) selection of one of five disc tracks for recording segment scan signals, and (2) recording of "quality" segment scan video signals when one, and only one, tone is detected by one of the tone detectors.

| $S_1$ | $S_2$ | $S_3$ | $S_4$ | $S_5$ |   | $S_1$ | $S_2$ | $S_3$ | $S_4$ | $S_5$ |
|---|---|---|---|---|---|---|---|---|---|---|
| 0 | 0 | 0 | 0 | 0 | 0 | 0 | 0 | 0 | 0 | 0 |
| 1 | 0 | 0 | 0 | 0 | 1 | 1 | 0 | 0 | 0 | 0 |
| 0 | 1 | 0 | 0 | 0 | 1 | 0 | 1 | 0 | 0 | 0 |
| 1 | 1 | 0 | 0 | 0 | 0 | 0 | 0 | 0 | 0 | 0 |
| 0 | 0 | 1 | 0 | 0 | 1 | 0 | 0 | 1 | 0 | 0 |
| 1 | 0 | 1 | 0 | 0 | 0 | 0 | 0 | 0 | 0 | 0 |
| 0 | 1 | 1 | 0 | 0 | 0 | 0 | 0 | 0 | 0 | 0 |
| 1 | 1 | 1 | 0 | 0 | 0 | 0 | 0 | 0 | 0 | 0 |
| 0 | 0 | 0 | 1 | 0 | 1 | 0 | 0 | 0 | 1 | 0 |
| 1 | 0 | 0 | 1 | 0 | 0 | 0 | 0 | 0 | 0 | 0 |
| 0 | 1 | 0 | 1 | 0 | 0 | 0 | 0 | 0 | 0 | 0 |
| 1 | 1 | 0 | 1 | 0 | 0 | 0 | 0 | 0 | 0 | 0 |
| 0 | 0 | 1 | 1 | 0 | 0 | 0 | 0 | 0 | 0 | 0 |
| 1 | 0 | 1 | 1 | 0 | 0 | 0 | 0 | 0 | 0 | 0 |
| 0 | 1 | 1 | 1 | 0 | 0 | 0 | 0 | 0 | 0 | 0 |
| 1 | 1 | 1 | 1 | 0 | 0 | 0 | 0 | 0 | 0 | 0 |
| 0 | 0 | 0 | 0 | 1 | 1 | 0 | 0 | 0 | 0 | 1 |
| 1 | 0 | 0 | 0 | 1 | 0 | 0 | 0 | 0 | 0 | 0 |
| 0 | 1 | 0 | 0 | 1 | 0 | 0 | 0 | 0 | 0 | 0 |
| 1 | 1 | 0 | 0 | 1 | 0 | 0 | 0 | 0 | 0 | 0 |
| 0 | 0 | 1 | 0 | 1 | 0 | 0 | 0 | 0 | 0 | 0 |
| 1 | 0 | 1 | 0 | 1 | 0 | 0 | 0 | 0 | 0 | 0 |
| 0 | 1 | 1 | 0 | 1 | 0 | 0 | 0 | 0 | 0 | 0 |
| 1 | 1 | 1 | 0 | 1 | 0 | 0 | 0 | 0 | 0 | 0 |
| 0 | 0 | 0 | 1 | 1 | 0 | 0 | 0 | 0 | 0 | 0 |
| 1 | 0 | 0 | 1 | 1 | 0 | 0 | 0 | 0 | 0 | 0 |
| 0 | 1 | 0 | 1 | 1 | 0 | 0 | 0 | 0 | 0 | 0 |
| 1 | 1 | 0 | 1 | 1 | 0 | 0 | 0 | 0 | 0 | 0 |
| 0 | 0 | 1 | 1 | 1 | 0 | 0 | 0 | 0 | 0 | 0 |
| 1 | 0 | 1 | 1 | 1 | 0 | 0 | 0 | 0 | 0 | 0 |
| 0 | 1 | 1 | 1 | 1 | 0 | 0 | 0 | 0 | 0 | 0 |
| 1 | 1 | 1 | 1 | 1 | 0 | 0 | 0 | 0 | 0 | 0 |
| ROM Input | | | | | Exactly One | Which One | | | | |

ROM Output (A sync tip detector 360 AND's with the "one only" output of the read-only-memory 354 to assure that whole lines are recorded on the disc.)

Figure 16:
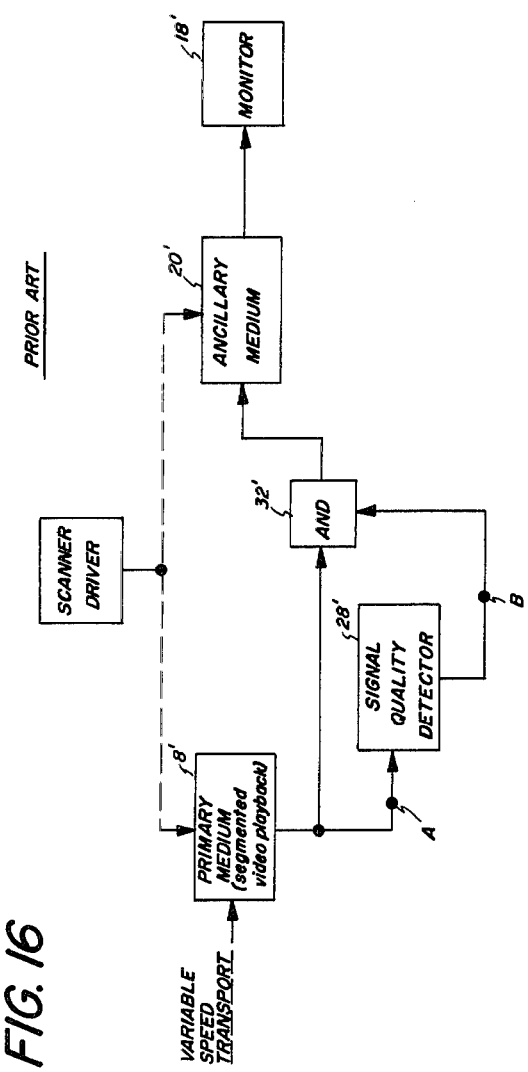

Reference should now be had to FIG. 16 for an overview of the playback/editing apparatus as disclosed above; for sake of convenience, the structure of FIG. 16 is related to the corresponding structure of FIG. 1 by the use of primed character notations. As the primary medium 8' (tape) containing segmented video information (e.g., two segments per field) is transported past rotary scanning apparatus, the signals played off the medium 8' are evaluated for quality (28') "and" (32'), if of acceptable quality, they are applied to and recorded in tracks, respective of segments, on the ancillary medium 20' (disc), the ancillary medium being rotationally slaved to the scanning apparatus. Thus segment #1 signals go to track #1 of the ancillary medium 20'; segment #2 signals go to track #2 of the ancillary medium; and this goes on continually . . . irrespective of video field. Each time a quality signal is produced by scanning a #1 segment on the primary medium 8', that signal is recorded in the ancillary medium #1 track over the signal formerly recorded there; similarly, each time a quality signal is produced by scanning a #2 segment on the primary medium 8', that signal is recorded in the ancillary medium #2 track over the signal formerly recorded there. A monitor 18' cooperates with the ancillary medium 20' to display images corresponding to signal information recorded on the ancillary medium.

Given, as will be the practice during editing, that the primary medium will be slewed very fast, and then very slow (even stopped), relative to the rate at which the primary medium was transported during recording, the signal information transferred to the ancillary medium 20' of FIG. 16 will always be quality signal information, albeit that the signal information may have stemmed from different video fields. Thus, the monitor 18', in cooperation with the ancillary medium 20', will always produce a coherent display that is useful during editing.

As described earlier in connection with FIGS. 10-15, the video segments recorded on the primary medium 8' are provided with corresponding tone code signals: segment #1 signals have a tone #1; segment #2 signals have a tone #2; etc. As a vehicle for determining signal quality, the apparatus of FIGS. 10-15 operates on the basis that the scanning apparatus produces good quality video signals if the scanner is "on track", i.e. one, and only one, tone is produced. If two (or no) tones are produced by the scanning apparatus, then the scanner is presumed to be between recorded segments, and thus the video signal information produced by the scanning apparatus is presumed to be of low quality—and thus not used to update signal information recorded on the ancillary medium 20'.

Consider now the timing diagram of FIG. 17a in which it is assumed that the primary medium 8' is transported at its record speed: the scanning apparatus produces first the segment 1 tone $T_1$ (field 1), then the segment 2 tone $T_2$ (field 1), then the segment 1 tone $T_1$ (field 2), etc. Because playback occurs while transporting the primary medium 8' at record speed, the scanning apparatus tracks one segment fully, then another fully, etc. (and attendantly each segment is recorded on the ancillary medium 20' as discussed above). Now consider that the primary medium is transported at, say, a faster-than-record speed. See FIG. 17b. As the scanning apparatus gradually goes off-track, the segment 1 tone $T_1$ starts to fade; and the segment 2 tone $T_2$ starts to appear, etc. By judiciously selecting a reference signal level L above which it is assumed that a detected tone signal is indicative of the scanning apparatus reasonably tracking a corresponding recorded segment on the primary medium 8', a measure of playback signal quality is provided. However, because the reference L can drift . . . and because the sensitivity of the primary medium 8' may be variable (which is tantamount to saying that the base B shifts) . . . the use of tone codes is at best a coarse measure of playback signal quality.

To complement the coarse measure of playback signal quality produced by the apparatus of FIGS. 10-15, the present invention uses to advantage the fact that horizontal video sync pulses produced from tape slewed at other than its record speed will have a phase error relative to sync pulses produced when the tape is moved at its record speed. That this fact is so may be discerned from FIGS. 18a and 18b: Referring first to FIG. 18a, a vector TL corresponds to the length of a "helical" scan record path on a tape; a vector $TL_s$ corresponds to the length of the path that a "helical" scanner would actually follow were such tape to be stopped; and a vector $\Delta L$ corresponds to the distance that such tape would travel while running at its record speed, and while scanning the path TL. (Of course, the vector diagram would change, as depicted by dashed lines, were the tape actually run at a speed which was faster than its record speed. Also, although the vector diagram corresponds only to the situation where a head starts on and moves off a track, the invention is also applicable where a head starts off a track and moves to or crosses such track.) Now realizing also that the vector TL corresponds to a head-to-tape speed of a certain amount, and that the vector $TL_s$ corresponding to a lesser head-to-tape speed, it will be appreciated that horizontal sync pulses recorded along the path (TL) will not be sensed in their proper phase (indeed they will be continually late) while scanning along the (stopped tape) vector path $TL_s$. This may be understood from FIG. 18b: Given the situation where a head gap G traverses perfectly along the length of a record path TL, the head gap G "sees" a sync pulse S at a distance (i.e., time) h along the path TL. Were the head gap G' to traverse along the (stopped tape) path $TL_s$, however, it would not see the sync pulse S until it had travelled the distance h' and reached the position $P_{G'}$. Therefore, for any given scanner, sync pulses produced while scanning a stopped tape will occur later than they would were the tape run at record speed. (And, by similar reasoning, the reverse is true.)

With the above as background, reference should now be had to FIG. 19 which shows a presently preferred circuit for determining the quality of a playback signal. (Note should be made that the circuit of FIG. 19 is to be connected to points A, B of FIG. 16 as a replacement for the circuit 28' thereof; parts of FIG. 19, having corresponding parts appearing in other figures are provided with similar character notations, but which notations are double primed.) A circuit 28" corresponds to the prior art signal quality detector 28' of FIG. 16, and embraces tone detectors 352" which operate to produce tone code gate signals during segment scanning and, as taught in connection with FIG. 13, when one "or" another tone signal is "exclusively" detected (354"), an indication (albeit a coarse one) of good playback signal quality is indicated. In accordance with the present invention, such an indication requires complementing by a fine measure of playback signal quality before "good signal quality" is actually identified as having been played. To this end, a sync detector 424" is provided for indicating the playback of sync signals recorded along the length of a segment scan of the primary medium 8', the output of the sync detector being phase compared (426") to a reference, or studio, sync which corresponds phasewise to sync which is recovered while playing back tape that is run at record speed. Thus, as discussed in connection with FIGS. 18a and 18b, the magnitude of the phase error output of the phase comparator 426″ corresponds closely to the degree of playback tracking and, as such, is a "fine" measure of playback signal quality. So long as the phase error signal output of the phase comparator 426″ is less than a predetermined amount—as determined by a dead zone circuit 428″—a NAND gate 430″ is held open. Dead zone devices are well known and may, for example, comprise simply a pair of diodes (zener) which are connected in parallel, the anode of one being connected to the cathode of the other, and vice versa. When either threshold of the dead zone circuit is exceeded by the error voltage of the circuit 426″, the dead zone circuit 428″ has an output which closes the gate 430″.

OPERATION (See FIGS. 16, 19)

Playback while transporting the primary medium 8′, at its record speed: While scanning one segment track after another of the primary medium, clear signal tones (as in FIG. 17*a*) occur, causing the "exclusive or" circuit 354″ to produce an output signal and, since playback is at record speed, the phase comparator 426″ has no output signal. Thus, the NAND gate 430″ has an output (at B) which opens the gate 32′ (FIG. 16) to allow recording of playback video signals on the ancillary medium 20′.

Playback while transporting the primary medium 8′, at other than its record speed, e.g., while the primary medium is stopped: Such playback causes clear tone signals to fade gradually into paired tones (thus causing the "exclusive or" circuit 354″ to produce a periodically occurring signal), and causing the dead zone circuit 428″ to produce a periodically occurring output signal. Since the outputs of the circuits 354″, 428″ are both applied to the NAND gate 430″, it periodically opens the gate 32′ for periodic recording of good quality video on the ancillary medium 20′.

The invention has been described in detail with particular reference to certain preferred embodiments thereof, but it will be understood that variations and modifications can be effected within the spirit and scope of the invention.

What is claimed is:

1. For use with a machine adapted for the playback of segmented field video information recorded on magnetic tape in the form of discrete signal tracks corresponding to the video field segments, each said signal track having recorded therein sync and segment identifier signals and each video field being comprised of N segments per field, said machine having a rotary assembly of magnetic heads adapted to scan said discrete signal tracks and produce signals therefrom, apparatus comprising:
    (a) an ancillary magnetic recording medium;
    (b) means for slaving said ancillary medium to the motion of said rotary assembly;
    (c) magnetic head means for recording N tracks on said ancillary magnetic medium;
    (d) means for selectively recording the video field segment signals in respective tracks of said ancillary recording medium; and
    (e) means for precluding the recording of signal information on said ancillary recording medium when said signal information has less than a predetermined quality, said means for precluding recording comprising
    means for producing a signal having a reference phase,
    first means responsive to said identifier signals to produce respective gate signals, and
    second means responsive to said sync signals for producing signals corresponding to the phase error between said sync signals and said signal having a reference phase, and
    logic means cooperative with said first and second means for effecting recording on said ancillary medium when one gate signal is exclusively produced coincidentally with a second means output error signal corresponding to a sync error less than a predetermined amount.

2. In apparatus usable in the playback of a magnetic tape, said tape having fields of segmented video information, including sync signals, recorded thereon, there being N signal segments per video field, said signal segments being in the form of signal tracks extending generally across the magnetic tape, and each said track being encoded with a segment identifier signal, said apparatus comprising:
    (a) a rotary scanner cooperative with said tape for scanning said tracks to produce video segment signals, sync signals and segment identifier signals;
    (b) a rotary ancillary recording medium;
    (c) means for slaving the rotation of said ancillary recording medium to the rotation of said scanner;
    (d) magnetic recording means cooperative with said ancllary recording medium for recording at least one grouping of N tracks thereon;
    (e) means for applying the signals of the N signal segments of said video fields to respective tracks of said N tracks, the segment signals of one field being recorded over the segment signals of another field; and
    (f) means for assuring that segment signals above a predetermined quality are recorded on said ancillary recording medium,
the improvement wherein said last named means for assuring comprises:
    (A) means for producing reference sync signals;
    (B) means for receiving the reference sync signals and said sync signals recorded on said tape for comparing the phase of said reference sync signals with the phase of said recorded sync signals to produce phase error signals; and
    (C) means for receiving said identifier signals and said phase error signals for effecting recording on said ancillary recording medium when both said error signal is less than a predetermined magnitude and when one identifier signal is contemporaneously exclusively produced.

3. In apparatus usable in the playback of a magnetic tape, said tape having video field information, including sync signals, recorded thereon, said field information being comprised of N signal segments per field, said signal segments being in the form of signal tracks extending generally across the magnetic tape, and each said track being encoded with segment identifying tone signals, said apparatus having:
    (a) a rotary scanner cooperative with said tape for scanning said tracks to produce video segment signals and segment tone signals;
    (b) a rotary ancillary recording medium;
    (c) means for slaving the rotation of said ancillary recording medium to the rotation of said scanner;
    (d) magnetic recording means cooperative with said ancillary recording medium for recording at least one grouping of N tracks thereon;

(e) means for applying the N segment signals of said video fields to respective tracks of said N tracks, the segment signals of one field being recorded over the segment signals of another field; and
(f) means for assuring that segment signals of at least a predetermined quality are recorded on said ancillary recording medium, the improvement wherein said last named means is comprised of:

(A) means for producing reference sync signals,
(B) means for detecting the sync signals recorded on said tape,
(C) means for comparing the phases of said reference and recorded sync signals to produce a phase error signal, and
(D) means responsive to said error signal and to said detected tone signals for effecting said recording on said ancillary medium only when said error signal is less than a predetermined level and when substantially only one tone signal is contemporaneously detected.

* * * * *